(12) United States Patent
Ahn

(10) Patent No.: US 11,840,631 B2
(45) Date of Patent: Dec. 12, 2023

(54) POLYIMIDE-BASED FILM AND FLEXIBLE DISPLAY PANEL INCLUDING THE SAME

(71) Applicants: SK Innovation Co., Ltd., Seoul (KR); SK IE Technology Co., Ltd., Seoul (KR)

(72) Inventor: Jong Nam Ahn, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 367 days.

(21) Appl. No.: 17/036,080

(22) Filed: Sep. 29, 2020

(65) Prior Publication Data

US 2021/0095121 A1 Apr. 1, 2021

(30) Foreign Application Priority Data

Sep. 30, 2019 (KR) .................. 10-2019-0120536

(51) Int. Cl.
*C08L 79/08* (2006.01)
*C08J 7/046* (2020.01)
*C08G 73/10* (2006.01)

(52) U.S. Cl.
CPC .......... *C08L 79/08* (2013.01); *C08G 73/1039* (2013.01); *C08G 73/1067* (2013.01); *C08J 7/046* (2020.01); *C08L 2203/16* (2013.01)

(58) Field of Classification Search
CPC ...... C08G 73/01; C08G 73/14; C08J 2379/08; C08L 79/08
See application file for complete search history.

(56) References Cited

U.S. PATENT DOCUMENTS

| | | | |
|---|---|---|---|
| 9,676,960 B2 | 6/2017 | Kim et al. | |
| 10,280,336 B2 | 5/2019 | Shin et al. | |
| 10,591,761 B2 | 3/2020 | Jee et al. | |
| 10,815,378 B2 | 10/2020 | Kim et al. | |
| 2011/0082276 A1 | 4/2011 | Park et al. | |
| 2016/0024348 A1 | 1/2016 | Kim et al. | |
| 2016/0046830 A1* | 2/2016 | Kim | C08G 77/045 522/170 |
| 2018/0044476 A1* | 2/2018 | Park | C08G 73/1021 |
| 2019/0256658 A1 | 8/2019 | Odle et al. | |
| 2019/0359772 A1 | 11/2019 | Kim et al. | |
| 2020/0061981 A1 | 2/2020 | Lim et al. | |

FOREIGN PATENT DOCUMENTS

| | | |
|---|---|---|
| JP | 2987950 B2 | 12/1999 |
| JP | 2017119421 A | 6/2017 |
| KR | 1020110035057 A | 4/2011 |
| KR | 1020130071650 A | 7/2013 |
| KR | 1020130141995 A | 12/2013 |
| KR | 1020150104282 A | 9/2015 |
| KR | 1020150113916 A | 10/2015 |
| KR | 1020160013402 A | 2/2016 |
| KR | 1020160020615 A | 2/2016 |
| KR | 1020170079114 A | 7/2017 |
| KR | 101831884 B1 | 2/2018 |
| KR | 1020180018307 A | 2/2018 |
| KR | 101839293 B1 | 3/2018 |
| KR | 1020180044216 A | 5/2018 |
| KR | 101922169 B1 | 11/2018 |
| KR | 1020180126951 A | 11/2018 |
| KR | 1020190003545 A | 1/2019 |
| KR | 1020190029110 A | 3/2019 |
| KR | 1020190029790 A | 3/2019 |
| KR | 1020190090300 A | 8/2019 |
| WO | WO 2018147605 * | 8/2018 |

* cited by examiner

*Primary Examiner* — Gregory Listvoyb
(74) *Attorney, Agent, or Firm* — THE WEBB LAW FIRM

(57) ABSTRACT

Provided are a polyimide-based film, a window cover film, and a display device including the same. In detail, provided is a polyimide-based film whose solubility in an ethyl cellosolve solvent satisfies the following Equation 1:

$$\frac{(FW_1 - FW_2)}{FW_1} \times 100 \leq 50\% \qquad \text{[Equation 1]}$$

wherein $FW_1$ is a weight of an initial film before being immersed in a solvent, and $FW_2$ is a weight of the film measured after the film is immersed in an ethyl cellosolve solvent, left at 60° C. for 2 hours, and cooled to room temperature, the solvent is removed, and the film is dried at 80° C. for 4 hours.

9 Claims, No Drawings

POLYIMIDE-BASED FILM AND FLEXIBLE DISPLAY PANEL INCLUDING THE SAME

CROSS-REFERENCE TO RELATED APPLICATION

This application claims priority to Korean Patent Application No. 10-2019-0120536 filed Sep. 30, 2019, the disclosure of which is hereby incorporated by reference in its entirety.

TECHNICAL FIELD

The following disclosure relates to a polyimide-based film, a window cover film, and a display panel including the same.

BACKGROUND

Display devices include a window cover provided on a display panel in order to protect the display panel from a scratch or an external impact and configured to be transparent so that a user may view a display unit in front of the display panel.

Display devices are gradually becoming lighter, thinner, and flexible. Thus, instead of tempered glass, a window cover manufactured from a polymer film having high hardness, high rigidity, and flexible property has been actively studied.

Since such a window cover is formed on the outermost side of the display device, it is important to have a high display quality and to prevent distortion due to light, such as a mura phenomenon, a blackout phenomenon in which a screen looks black at a specific angle, or a rainbow phenomenon having a rainbow mura from occurring.

In particular, as a coating layer is laminated on a substrate layer in order to impart various physical properties to the window cover, scattered reflection of light is caused, an optical mura occurs, which deteriorates visibility and causes eye fatigue when applied to a display.

That is, various polymer window cover materials have been developed to replace expensive tempered glass, but there is a need to develop a window cover film capable of solving a distortion problem due to light on the window cover.

RELATED ART DOCUMENT

Patent Document (Patent Document 1) Korean Patent Laid-Open Publication No. 10-2015-0104282

SUMMARY

An embodiment of the present invention is directed to providing a window cover film capable of preventing the occurrence of an optical mura and minimizing distortion due to light.

An object of the present invention is to solve a problem that a haze of a film is increased and an optical mura occurs after a coating composition is applied in a post-process of forming a coating layer on a polyimide-based film in order to manufacture a window cover film.

Another embodiment of the present invention is directed to providing a transparent polyimide-based film capable of minimizing the occurrence of an optical mura such as a rainbow mura or a mura by adjusting a solubility of a coating composition in a solvent in a coating process to prevent or minimize a change in a surface property.

Another embodiment of the present invention is directed to providing a display panel having excellent visibility.

In one general aspect, there is provided a polyimide-based film whose solubility in an ethyl cellosolve solvent satisfies the following Equation 1:

$$\frac{(FW_1 - FW_2)}{FW_1} \times 100 \leq 50\% \qquad \text{[Equation 1]}$$

wherein $FW_1$ is a weight of an initial film before being immersed in a solvent, and $FW_2$ is a weight of the film measured after the film is immersed in an ethyl cellosolve solvent, left at 60° C. for 2 hours, and cooled to room temperature, the solvent is removed, and the film is dried at 80° C. for 4 hours.

The solubility may be 20 to 50%.

The polyimide-based film may have a modulus of 4 GPa or more and an elongation at break of 8% or more according to ASTM D882, a light transmittance of 5% or more measured at 388 nm, a total light transmittance of 87% or more measured at 400 to 700 nm according to ASTM D1746, a haze of 2.0% or less according to ASTM D1003, and a yellowness of 5.0 or less and a value of 2.0 or less according to ASTM E313.

The polyimide-based film may have a polyamide-imide structure.

The polyimide-based film may include a unit derived from a fluorine-based aromatic diamine, a unit derived from an aromatic dianhydride, a unit derived from a cycloaliphatic dianhydride, and a unit derived from an aromatic diacid dichloride.

The cycloaliphatic dianhydride may include cyclobutane tetracarboxylic dianhydride (CBDA).

A thickness of the polyimide-based film may be 10 to 500 μm.

In another general aspect, there is provided a window cover film including:

the polyimide-based film as described above; and a coating layer formed on one or both surfaces of the polyimide-based film.

The coating layer may be any one or more selected from the group consisting of a hard coating layer, an anti-static layer, an anti-fingerprint layer, an anti-fouling layer, an anti-scratch layer, a low refractive layer, an anti-reflection layer, and an impact absorbing layer.

A change rate in a haze ΔH of the window cover film according to the following Equation 2 may be 1.5% or less:

$$\Delta H = |H2 - H1| \qquad \text{[Equation 2]}$$

wherein H1 is a haze of the polyimide-based film before the coating layer is formed, and H2 is a haze of the window cover film on which the coating layer is formed.

A haze of the window cover film may be 1.5% or less.

In another general aspect, there is provided a flexible display panel including the polyimide-based film as described above.

DETAILED DESCRIPTION OF EMBODIMENTS

Hereinafter, the present invention will be described in more detail. The following specific examples are only a reference for describing the present invention in detail, and the present invention is not limited thereto, and may be implemented in various forms.

In addition, all technical terms and scientific terms have the same meanings as those commonly understood by a person skilled in the art to which the present invention pertains unless otherwise defined. The terms used herein are only for effectively describing certain embodiments, and are not intended to limit the present invention.

Throughout the present specification describing the invention, unless explicitly described to the contrary, "comprising" any component will be understood to imply the further inclusion of other elements rather than the exclusion of other elements.

In addition, singular forms used in the detailed description and the claims are intended to include the plural forms unless otherwise indicated in context.

"Polyimide-based resin" used herein includes polyimide or polyamide-imide. The same goes for "polyimide-based film."

"Polyimide-based resin solution" used herein has the same meaning as "composition for forming the polyimide-based film" and "polyamide-imide solution". In addition, the polyimide-based resin and a solvent may be included in order to form a polyimide-based film.

"Film" used herein is obtained by applying and drying the "polyimide-based resin solution" on a support and peeling from the support, which may be stretched or unstretched.

The present inventors have completed the present invention by finding that a film in which a haze is not increased and an optical physical property is excellent due to excellent transmittance may be provided at the time of forming a hard coating layer in a state where a solubility of a polyimide-based film in a specific solvent, particularly, an ethyl cellosolve solvent is in a specific range, more specifically, a range of 50% or less, and preferably, a range of 20 to 50% in a case where the polyimide-based film is used as a window cover film for a display panel as a result of performing many studies in order to solve the above problem.

<Polyimide-Based Film>

In more detail, the polyimide-based film of the present invention is characterized in that a solubility in an ethyl cellosolve solvent satisfies the following Equation 1:

$$\frac{(FW_1 - FW_2)}{FW_1} \times 100 \le 50\% \qquad \text{[Equation 1]}$$

wherein $FW_1$ is a weight of an initial film before being immersed in a solvent, and $FW_2$ is a weight of the film measured after the film is immersed in an ethyl cellosolve solvent, left at 60° C. for 2 hours, and cooled to room temperature, the solvent is removed, and the film is dried at 80° C. for 4 hours.

The solubility may be more preferably 20 to 50% because a coating property may be excellent when a coating layer is formed on the polyimide-based film in a state where the solubility is in this range, and it is possible to provide a window cover film in which a change in a haze is within 1.5% and an optical property is excellent, which is desired, after a post-process of forming a hard coating layer.

In more detail, it is possible to provide a film that satisfies the solubility described above, and thus has a small change rate in a haze, that is, has a small difference between the haze after the coating layer is formed and the haze when the coating layer is not formed. Accordingly, it is possible to provide a polyimide-based film having an excellent optical property and a window cover film using the same.

In an aspect of the present invention, the polyimide-based film may have a thickness of 10 to 500 μm, 20 to 250 μm, or 30 to 100 μm.

In an aspect of the present invention, the polyimide-based film may have a modulus of 3 GPa or more, 4 GPa or more, or 5 GPa or more and an elongation at break of 8% or more, 12% or more, or 15% or more and an elongation at break of 8% or more, 12% or more, or 15% or more according to ASTM D882, a light transmittance of 5% or more or 5 to 80% measured at 388 nm, a total light transmittance of 87% or more, 88% or more, or 89% or more measured at 400 to 700 nm according to ASTM D1746, a haze of 2.0% or less, 1.5% or less, or 1.0% or less according to ASTM D1003, a yellowness of 5.0 or less, 3.0 or less, or 0.4 to 3.0 and a b* value of 2.0 or less, 1.3 or less, or 0.4 to 1.3 according to ASTM E313.

In an aspect of the present invention, the polyimide-based film is a polyimide-based resin, and in particular is a polyimide-based resin having a polyamide-imide structure.

In addition, the polyimide-based film may be more preferably a polyamide-imide-based resin including a fluorine atom and an alicyclic structure, and thus may have an excellent mechanical property and dynamic bending property. In addition, it is preferred because the polyamide-imide-based film includes cycloaliphatic dianhydride and is thus more advantageous to achieve the physical property that solubility in the ethyl cellosolve solvent is 50% or less.

In an aspect of the present invention, it is preferred that the polyamide-imide polymer is prepared as an example of the polyamide-imide-based resin including a fluorine atom and an alicyclic structure by preparing an amine-terminated polyamide oligomer derived from a first fluorine-based aromatic diamine and an aromatic diacid dichloride and then polymerizing the amine-terminated polyamide oligomer with a monomer derived from a second fluorine-based aromatic diamine, an aromatic dianhydride, and a cycloaliphatic dianhydride because the object of the present invention is better achieved. The first fluorine-based aromatic diamine and the second fluorine-based aromatic diamine may be of the same or different types.

In an aspect of the present invention, when the amine-terminated oligomer in which an amide structure in a polymer chain is formed by aromatic diacid dichloride, is included as a monomer of a diamine, in addition to the improvement in the optical property, in particular, mechanical strength including modulus may be improved, and the dynamic bending property may also be further improved.

In an aspect of the present invention, when having a polyamide oligomer block as described above, a molar ratio between the diamine monomer including the amine-terminated polyamide oligomer and the second fluorine-based aromatic diamine, and the dianhydride monomer including the aromatic dianhydride and the cycloaliphatic dianhydride of the present invention, may be preferably 1:0.8 to 1.1, preferably 1:0.9 to 1, and more preferably 1:1. In addition, a content of the amine-terminated polyamide oligomer with respect to the entire diamine monomer is not particularly limited. However, it is more preferable to include 30 mol % or more, preferably 50 mol % or more, and more preferably 70 mol % or more for satisfying a mechanical property, a yellowness, and an optical property of the present invention. Further, when the polyamide-imide film having a difference in a surface energy of the present invention is provided, it is possible to increase selectivity of a coating solvent due to various solubility. In addition, a composition ratio of between the aromatic dianhydride and the cycloaliphatic dianhydride is not particularly limited. However, when considering the achievement of a transparency, a yellowness, and a mechanical property, etc. of the present invention, it is preferable to use in a ratio of 30 to 80 mol %: 70 to 20 mol %, but is not necessarily limited thereto.

In addition, another example of the polyamide-imide-based resin including a fluorine atom and an alicyclic structure in the present invention may include a polyamide-imide-based resin obtained by mixing, polymerization and imidization of a fluorine-based aromatic diamine, an aromatic dianhydride, a cycloaliphatic dianhydride, and an aromatic diacid dichloride. This resin has a random copolymer structure, and with respect to 100 moles of the diamine, a content of the aromatic diacid dichloride may be 40 moles or more, preferably 50 to 80 mol, a content of the aromatic dianhydride may be 10 to 50 mol, and a content of the cycloaliphatic dianhydride may be 10 to 60 mol, and it may be prepared by polymerizing diacid dichloride and dianhydrate in a molar ratio of 1:0.9 to 1.1 with respect to the diamine monomer. It is preferably polymerized in a molar ratio of 1:1. The random polyamide-imide of the present invention may also fall within the scope of the present invention, although there is a slight difference in the optical property such as a transparency, a mechanical property, and a solvent sensitivity due to a difference in a surface energy as compared to the block-type polyamide-imide resin In an aspect of the present invention, the fluorine-based aromatic diamine component may be used in combination with 2,2'-bis(trifluoromethyl)-benzidine and other known aromatic diamine components, but 2,2'-bis(trifluoromethyl)-benzidine may be used alone. Such a fluorine-based aromatic diamine is used, such that the polyamide-imide-based film may improve an excellent optical property and a yellowness, based on the mechanical property required in the present invention. In addition, in the hard coating film, the mechanical strength may be improved and the dynamic bending property may be further improved by improving a tensile modulus of the polyamide-imide film.

The aromatic dianhydride may be, but is not limited to, at least one or a mixture of two or more selected from the group consisting of 4,4'-hexafluoroisopropylidene diphthalic anhydride (6FDA) and biphenyltetracarboxylic dianhydride (BPDA), oxydiphthalic dianhydride (ODPA), sulfonyl diphthalic anhydride (SO2DPA), (isopropylidenediphenoxy) bis (phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxyphenyl) dimethyl silane dianhydride (SiDA), and bis (dicarboxyphenoxy) diphenyl sulfide dianhydride (BDSDA).

The cycloaliphatic dianhydride may be, for example, any one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof.

In an aspect of the present invention, when the amide structure in the polymer chain is formed by the aromatic diacid dichloride, in addition to the improvement in the optical properties, in particular, mechanical strength including modulus may be greatly improved, and the dynamic bending property may also be further improved.

The aromatic diacid dichloride may be, but is not limited to, a mixture of two or more selected from the group consisting of isophthaloyl dichloride (IPC), terephthaloyl dichloride (TPC), 1,1'-biphenyl-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof.

In the present invention, a weight average molecular weight of the polyimide-based resin is not particularly limited, but may be 200,000 g/mol or more, preferably 300,000 g/mol or more, and more preferably 200,000 to 500,000 g/mol. In addition, a glass transition temperature is not limited, but may be 300 to 400° C., and more specifically 330 to 380° C. The above range is preferred because a film in which a modulus is high, a mechanical strength and an optical property are excellent, and curing occurrence is less may be provided in the above range, but the range of the temperature is not necessarily limited thereto.

Hereinafter, a method of manufacturing the polyimide-based film will be illustrated.

In an aspect of the present invention, the polyimide-based film may be manufactured by applying the "polyimide-based resin solution" containing the polyimide-based resin and the solvent on a substrate, followed by drying or drying and stretching. That is, the polyimide-based film may be manufactured by a solution casting method.

As an example, the polyimide-based film may be manufactured including: preparing an oligomer by reacting a fluorine-based aromatic diamine with an aromatic diacid dichloride, preparing a polyamic acid solution by reacting the prepared oligomer with a fluorine-based aromatic diamine, an aromatic dianhydride, and a cycloaliphatic dianhydride, preparing a polyamide-imide resin by imidizing the polyamic acid solution, and forming a film by applying a polyamide-imide solution in which the polyamide-imide resin is dissolved in an organic solvent.

Hereinafter, each step will be described in more detail as an example of the manufacturing a block-type polyamide-imide film.

The preparing of the oligomer may include reacting a fluorine-based aromatic diamine with an aromatic diacid dichloride in a reactor, and purifying and drying the obtained oligomer. In this case, the fluorine-based aromatic diamine may be added in a molar ratio of 1.01 to 2 compared to the aromatic diacid dichloride, and an amine-terminated polyamide oligomer monomer may be prepared. A molecular weight of the oligomer monomer is not particularly limited, but for example, when the weight average molecular weight is in the range of 1000 to 3000 g/mol, more excellent physical property may be obtained.

In addition, it is preferable to use an aromatic carbonyl halide monomer such as terephthaloyl chloride or isophthaloyl chloride, not terephthalic acid ester or terephthalic acid itself in order to introduce the amide structure. It seems that a chlorine element affects the physical property of the film, but it is not clear.

Next, the preparing of the polyamic acid solution may be performed through a solution polymerization in which the prepared oligomer and a fluorine-based aromatic diamine, an aromatic dianhydride, and a cycloaliphatic dianhydride are polymerized in an organic solvent. Here, the organic solvent used for the polymerization may be, for example, any one or two or more polar solvents selected from the group consisting of dimethylacetamide (DMAc), N-methyl- 2-pyrrolidone (NMP), dimethylformamide (DMF), dimethylsulfoxide (DMSO), ethyl cellosolve, methyl cellosolve, acetone, ethylacetate, and m-cresol.

More specifically, a polyamide-imide-based film in which an amide intermediate is uniformly distributed may be manufactured by reacting a fluorine-based aromatic diamine and an aromatic diacid dichloride to prepare an intermediate in the form of an oligomer including an amide unit, and then reacting the oligomer with a fluorine-based aromatic diamine, an aromatic dianhydride, and a cycloaliphatic dianhydride to prepare a polyamic acid solution. As such, as the amide intermediate is uniformly distributed throughout the film, for the entire area of the film, the mechanical property is excellent and the optical property is excellent, and the coating property and coating uniformity of the coating composition used in the post-coating process of the hard coating layer, etc. are further improved, such that the optical property of the final window cover film are further improved. Thus, it is possible to provide a film having excellent optical property in which an optical mura such as a rainbow mura and a mura do not occur.

Next, the preparing of the polyamide-imide resin by imidizing the polyamic acid solution may be performed through chemical imidization, and it is more preferable that the polyamic acid solution is chemically imidized using pyridine and acetic anhydride. Subsequently, the imidization may be performed at a low temperature of 150° C. or less, preferably 100° C. or less, and specifically 50 to 150° C. using an imidization catalyst and a dehydrating agent.

This method makes it possible to impart uniform mechanical property to the entire film as compared to an imidization reaction by heat at a high temperature.

The imidization catalyst may be any one or two or more selected from the group consisting of pyridine, isoquinoline, and β-quinoline. In addition, the dehydrating agent may be any one or two or more selected from the group consisting of acetic anhydride, phthalic anhydride, and maleic anhydride, but is not necessarily limited thereto.

In addition, the polyamide-imide resin may be prepared by mixing an additive such as flame retardants, adhesion enhancers, inorganic particles, antioxidants, UV inhibitors, and plasticizers in the polyamic acid solution.

Further, after imidization, the resin may be purified using the solvent to obtain a solid content, and the resulting solid may be dissolved in the solvent to obtain a polyamide-imide solution. The solvent may include, but is not limited to, for example, N,N-dimethylacetamide (DMAc), etc.

The forming of the film by applying the polyamide-imide solution, is performed by applying the polyamide-imide solution to the substrate and then drying it in a drying step partitioned into a drying zone. In addition, stretching may be performed after or before drying, if necessary, and a heat treatment step may be further provided after the drying or stretching. The substrate may be, but is not limited to, for example, a glass, a stainless steel, or a film, etc. Application may be performed by a die coater, an air knife, a reverse roll, a spray, a blade, a casting, a gravure, a spin coating, etc.

<Window Cover Film>

Another aspect of the present invention provides a window cover film including the above-described polyimide-based film; and a coating layer formed on the polyimide-based film.

When the hard coating layer is laminated on a polyimide-based film whose solubility is a specific range, the window cover film in which a change in a haze is within 1.5% and a visibility is significantly improved may be provided.

In an aspect of the present invention, the window cover film may satisfy all physical properties of a light transmittance of 3% or more measured at 388 nm and a total light transmittance of 87% or more, 88% or more, or 89% or more measured at 400 to 700 nm according to ASTM D1746, a haze of 1.5% or less, 1.2% or less, or 1.0% or less according to ASTM D1003, a yellowness of 4.0 or less, 3.0 or less, or 2.0 and a b* value of 2.0 or less, 1.5 or less, or 1.2 or less according to ASTM E313.

More specifically, the window cover film may have a change in a haze of 1.5% or less according to Equation 2 below, more preferably 0.01 to 1.5%, and even more preferably 0.05 to 0.5%. That is, the polyimide-based film whose solubility in an ethyl cellosolve solvent is 50% or less is used, such that after formation of a coating layer, a change in a haze is small. Thus, the window cover film having excellent optical property may be provided.

$$\Delta H(\%) = |H2 - H1| \quad \text{[Equation 2]}$$

wherein H1 is a haze of the polyimide-based film before the coating layer is firmed, and H2 is a haze of the window cover film on which the coating layer is formed.

In an aspect of the present invention, the coating layer is a layer for imparting functionality of the window cover film, and may be applied in various ways depending on the purpose.

For a specific example, the coating layer may include, but is not limited to, any one or more layers selected from the group consisting of a hard coating layer, a restoration layer, an impact diffusion layer, a self-cleaning layer, an anti-fingerprint layer, an anti-scratch layer, a low refractive index layer, and an impact absorbing layer.

Even though various coating layers as described above are formed on the polyimide-based film, it is possible to provide the window cover film in which a display quality is excellent, the optical property is excellent, and a rainbow phenomenon is significantly reduced.

In an aspect of the present invention, specifically, the coating layer may be formed on one or both surfaces of the polyimide-based film. For example, the coating layer may be disposed on an upper surface of the polyimide-based film, and may be disposed on the upper and lower surfaces of the polyimide-based film, respectively. The coating layer may protect the polyimide-based film having excellent optical and mechanical properties from external physical or chemical damage.

In an aspect of the present invention, the coating layer may be formed in a solid content of 0.01 to 200 $g/m^2$ with respect to the total area of the polyimide-based film. The coating layer may preferably be formed in a solid content of 20 to 200 $g/m^2$ with respect to the total area of the polyimide-based film. The above-described basis weight is provided, such that surprisingly, a rainbow phenomenon does not occur while maintaining functionality. Thus, excellent visibility may be implemented.

In an aspect of the present invention, specifically, the coating layer may be formed by applying a composition for forming a coating layer including a coating solvent on the polyimide-based film. The coating solvent is not particularly limited, but may preferably be a polar solvent. The polar solvent may be, for example, any one or more solvents selected from the group consisting of ether-based solvents, ketone-based solvents, alcohol-based solvents, amide-based solvents, sulfoxide-based solvents, and aromatic hydrocarbon-based solvents. Specifically, the polar solvent may be any one or more solvents selected from the group consisting of dimethylacetamide (DMAc), N-methyl-2-pyrrolidone (NMP), dimethylformamide (DMF), dimethylsulfoxide (DMSO), acetone, ethylacetate, propylene glycol methyl ether, m-cresol, methanol, ethanol, isopropanol, butanol, 2-methoxyethanol, methyl cellosolve, ethyl cellosolve, methyl ethyl ketone, methyl butyl ketone, methyl isobutyl ketone, methyl phenyl ketone, diethyl ketone, dipropyl ketone, cyclohexanone, hexane, heptane, octane, benzene, toluene, and xylene.

In an aspect of the present invention, for forming the coating layer, a method of forming the coating layer by applying the composition for forming a coating layer on the polyimide-based film may include, but is not limited to, for example, any one or more methods selected from a s spin coating method, an immersion method, a spray method, a die coating method, a bar coating method, a roll coater method, a meniscus coating method, a flexo printing method, a screen printing method, a bead coating method, an air knife coating method, a reverse roll coating method, a blade coating method, a casting coating method, and a gravure coating method.

In an aspect of the present invention, the coating layer may preferably be a hard coating layer. The hard coating layer may include any one or more selected from the group consisting of an organic material and an inorganic material. For example, the organic material includes carbon, and may include any one or more selected from non-metal elements such as hydrogen, oxygen, and nitrogen, based on the carbon. The inorganic material refers to a material other than the organic material, and may include any one or more selected from metal elements such as alkaline earth metals, alkali metals, transition metals, post-transition metals and metalloids. The inorganic material may include, for example, carbon dioxide, carbon monoxide, diamond, carbonate, etc., as an exception.

In an aspect of the present invention, the hard coating layer may be an organic material layer or an inorganic material layer alone, or may be a mixed layer of the organic and inorganic materials. The hard coating layer is not particularly limited, but may preferably include 10 to 90% by weight of the organic material and 10 to 90% by weight of the inorganic material. The hard coating layer may preferably include 40 to 80% by weight of the organic material and 20 to 60% by weight of the inorganic material. As described above, even though the hard coating layer including the organic and inorganic materials is formed, distortion due to light do not occur while having an excellent bond with the polyimide-based film, and in particular, the effect of preventing a rainbow phenomenon is excellent.

In an aspect of the present invention, the hard coating layer is not particularly limited, but may be, for example, a layer including any one or more polymers selected from the group consisting of an acryl-based polymer, a silicone-based polymer, an epoxy-based polymer, and a urethane-based polymer.

Specifically, the hard coating layer may be formed from a composition for forming the coating layer including an epoxysilane resin in order to prevent deterioration of the optical property and improve surface hardness, when the hard coating layer is formed on the polyimide-based film. Specifically, the epoxy siloxane resin may be a siloxane resin having an epoxy group. The epoxy group may be a cyclic epoxy group, an aliphatic epoxy group, an aromatic epoxy group, or a combination thereof. The siloxane resin may be a polymer compound in which a silicon atom and an oxygen atom are covalently bonded.

For example, the epoxysiloxane resin may preferably be a silsesquioxane resin. Specifically, in the silsesquioxane compound, a silicon atom may be directly substituted with an epoxy group, or a substituent in which the silicon atom is substituted may be substituted with an epoxy group. A non-limiting example may include a silsesquioxane resin in which a 2-(3,4-epoxycyclohexyl) group or a 3-glycidoxy group is substituted.

The epoxysiloxane resin may be prepared by alone alkoxysilane having the epoxy group in the presence of water, or may be prepared through a hydrolysis and condensation reaction between an alkoxysilane having the epoxy group and a heterogeneous alkoxysilane. In addition, the epoxysiloxane resin may be formed by polymerizing a silane compound having an epoxycyclohexyl group.

For example, the alkoxysilane compound having the epoxy group may any one or more selected from the group consisting of 2-(3,4-epoxycyclohexyl)ethyltrimethoxysilane, 2-(3,4-epoxycyclohexyl)ethyltriethoxysilane, and 3-glycidoxypropyltrimethoxysilane.

In an aspect of the present invention, the epoxysiloxane resin may have, but is not limited to, a weight average molecular weight of 1,000 to 20,000 g/mol. When the epoxysiloxane resin has the weight average molecular weight in the above range, it has an appropriate viscosity, such that it is possible to improve a flowability, a coating property, a curing reactivity, etc. of the composition for forming the coating layer, and it is possible to improve surface hardness of the hard coating layer.

In an aspect of the present invention, the epoxysiloxane resin may be included in an amount of 20 to 65% by weight, preferably 20 to 60% by weight with respect to the total weight of the composition for forming the coating layer. When the epoxy siloxane resin is included in the above range, it is possible to improve the surface hardness of the hard coating layer, and to induce uniform curing to prevent a physical defect such as a crack due to partial overcuring.

In an aspect of the present invention, the composition for forming the coating layer may further include a crosslinking agent and an initiator.

Specifically, the crosslinking agent is not particularly limited as long as it can form a crosslinking bond with the epoxysiloxane resin to solidify the composition for forming the coating layer and improve the hardness of the hard coating layer. However, the crosslinking agent may be, for example, any one or more selected from the group consisting of (3,4-epoxycyclohexyl)methyl-3',4'-epoxycyclohexanecarboxylate, diglycidyl 1,2-cyclohexanedicarboxylate, 2-(3,4-epoxycyclohexyl-5,5-spiro-3,4-epoxy)cyclohexane-meta-dioxane, bis(3,4-epoxycyclohexylmethyl)adipate), bis (3,4-epoxy-6-methylcyclohexyl)adipate, 3,4-epoxy-6-methylcyclohexylmethyl-3',4'-epoxy-6'-methylcyclohexanecarboxylate, 1,4-cyclohexanedimethanol bis(3,4-epoxycyclohexanecarboxylate), ethylenebis(3,4-epoxycyclohexanecarboxylate), 3,4-epoxycyclohexylmethyl (meth)acrylate, bis(3,4-epoxycyclohexylmethyl)adipate, 4-vinylcyclohexenedioxide, vinylcyclohexene monooxide, 1,4-cyclohexanedimethanol diglycidyl ether, and 2,2'-((1-methylethylidene)bis(cyclohexane-4,1-diyloxymethylene)) bisoxirane. Preferably, the crosslinking agent may be any one or more selected from the group consisting of (3,4-epoxycyclohexyl)methyl-3',4'-epoxycyclohexanecarboxylate and bis(3,4-epoxycyclohexylmethyl)adipate containing a compound to which 3,4-epoxycyclohexyl groups are linked.

In an aspect of the present invention, a content of the crosslinking agent is not particularly limited, and may be, for example, 5 to 150 parts by weight with respect to 100 parts by weight of the epoxysiloxane resin. In addition, according to an aspect of the present invention, the crosslinking agent may be included in an amount of 3 to 30% by weight and preferably 5 to 20% by weight with respect to the total weight of the composition for forming the coating layer. For the above ranges, it is possible to improve the coating property and curing reactivity of the composition for forming the coating layer.

In an aspect of the present invention, the initiator may be a photoinitiator or a thermal initiator. It may preferably be a photoinitiator, for example, the photoinitiator may include a photo-cationic initiator. The photo-cationic initiator may initiate polymerization of the epoxysiloxane resin and an epoxy-based monomer.

Specifically, the photo-cationic initiator may be, but is not limited to, any one or more selected from the group consisting of an onium salt and an organometallic salt. For example, the photo-cationic initiator may be, but is not limited to, any one or more selected from the group consisting of diaryliodonium salt, triarylsulfonium salt, aryldiazonium salt, and iron-arene complex.

In an aspect of the present invention, a content of the photo-cationic initiator is not particularly limited, and may be, for example, 1 to 15 parts by weight with respect to 100 parts by weight of the epoxysiloxane resin. In addition, according to an aspect of the present invention, the crosslinking agent may be included in an amount of 0.1 to 10% by weight and preferably 0.3 to 5% by weight with respect to the total weight of the composition for forming the coating layer. When a content of the photoinitiator is included in the above range, the hard coating layer may have excellent curing efficiency and prevent degradation in the physical property due to residual components after curing.

In an aspect of the present invention, the composition for forming the coating layer may further include, but is not limited to, any one or more additives selected from the group consisting of fillers, slip agent, light stabilizers, thermal polymerization inhibitors, leveling agents, lubricants, antifouling agents, thickeners, surfactants, antifoaming agents, antistatic agents, dispersants, initiators, coupling agents, antioxidants, UV stabilizers, and coloring agents.

More specifically, the hard coating layer may further include inorganic particles to impart hardness.

The inorganic particles may preferably be silica and more preferably, surface-treated silica, but are not limited thereto. Here, the surface treatment may include a functional group capable of reacting with the above-described crosslinking agent.

According to an aspect of the present invention, the inorganic particles may have, but is not limited to, an average diameter of 1 to 500 nm and preferably 10 to 300 nm.

When the hard coating layer described above is formed on the conventional polyimide-based film, the rainbow phenomenon could not be avoided due to the distortion due to light. However, the polyimide-based film according to the present invention hardly causes a rainbow phenomenon even if the hard coating layer described above is formed, and may implement excellent visibility.

In an aspect of the present invention, the window cover film may further include a substrate layer. The substrate layer may be formed on the other surface of the polyimide-based film on which the coating layer is not formed.

In an aspect of the present invention, the polyimide-based film may be prepared as a film and then laminated on the substrate layer, and may be laminated after coating a polyamic acid resin composition, which is a precursor of the polyimide-based film. However, it is not particularly limited as long as it can form the above-described laminated configuration.

In an aspect of the present invention, the substrate layer is not particularly limited as long as it is a substrate film of a commonly used window cover film. However, the substrate layer may include, for example, any one or more selected from the group consisting of an ester-based polymer, a carbonate-based polymer, a styrene-based polymer, and an acryl-based polymer. Specifically, the substrate layer may include, but is not limited to, any one or more selected from the group consisting of polyethylene terephthalate, polyethylene naphthalate, polybutylene terephthalate, polybutylene naphthalate, polycarbonate, polystyrene, and polymethyl methacrylate.

In an aspect of the present invention, the substrate layer may be a single layer, or may be a multilayer in which two or more are laminated. Specifically, the substrate layer may have an optical adhesive layer on an interface of two or more substrate films.

In an aspect of the present invention, the substrate layer may have a thickness of 50 to 300 µm. The substrate layer may preferably have a thickness of 100 to 300 µm, and more preferably 150 to 250 µm. The substrate layer has a thickness in the above ranges, such that not only the mechanical property may be satisfied, but also when the polyimide-based film is laminated, the distortion due to light may be significantly reduced.

In an aspect of the present invention, as a specific example, the optical adhesive layer may have, but is not limited to, any one or more selected from the group consisting of an optical clear adhesive (OCA), an optical clear resin (OCR), and a pressure sensitive adhesive (PSA).

In an aspect of the present invention, the window cover film may further include a second optical adhesive layer on an interface between the substrate layer and the polyimide-based film.

Specifically, the second optical adhesive layer formed on the interface between the substrate layer and the polyimide-based film may have the same or different materials as the optical adhesive layer in the above-described substrate layer, and may be formed to have a thickness of, for example, 20 to 120 µm. The second optical adhesive layer may preferably be formed to have a thickness of 20 to 80 µm. When the second optical adhesive layer is formed to have a thickness in the above ranges, the window cover film may implement an overall excellent optical property and an effect of improving distortion due to light.

In an aspect of the present invention, the window cover film has a high surface hardness and an excellent flexibility, is lighter than tempered glass, and has an excellent durability against deformation, and is thus excellent as a window substrate on the outermost surface of a flexible display panel.

Another aspect of the present invention provides a display device including a display panel and the above-described window cover film formed on the display panel.

In an aspect of the present invention, the display device is not particularly limited as long as it is a field requiring excellent optical property, and may be provided by selecting an appropriated display panel. Preferably, the window cover film may be applied to a flexible display device, and, as a specific example, may be applied to any one or more image display devices selected from various image display devices such as a liquid crystal display device, an electroluminescent display device, a plasma display device, and a field emission display device.

A display device including the window cover film of the present invention described above not only has excellent display quality, but also significantly reduces distortion due to light. Thus, in particular, a rainbow phenomenon in which a rainbow mura occurs may be significantly improved and user's eye fatigue may be minimized due to excellent visibility.

Hereinafter, the present invention will be described in more detail on the basis of Examples and Comparative Examples. However, the following Examples and Comparative Examples are an example for describing the present invention in more detail, and the present invention is not limited by the following Examples and Comparative Examples.

Hereinafter, the physical properties were measured as follows.

1) Pencil Hardness

A pencil hardness was measured on the basis of the case where a 20 mm line was drawn for each hardness of the pencils (Mitsubish Group) at a rate of 120 mm/sec using a load of 750 g, this was repeated five or more times and scratches occurs two or more times, with respect to a film according to JISK5400.

2) Modulus/Elongation at Break

Modulus/elongation at break were measured using an UTM 3365 (Instron Corp.) under the conditions of pulling at 50 mm/min at 25° C., with respect to a polyamide-imide film having 50 mm length and 10 mm width according to ASTM D882.

A thickness of the film was measured and the value was input into the instrument. The modulus is in GPa and the elongation at break is in %.

3) Light Transmittance

A total light transmittance was measured over the entire range of 400 to 700 nm wavelength using a spectrophotometer (Nippon Denshoku, Industries Co., Ltd., COH-400) and a single-wavelength transmittance was measured at 388 nm using an UV/Vis (Shimadzu, UV3600), with respect to a film having a thickness of 50 μm according to ASTM D1746 standard. The light transmittances is in %.

4) Haze

Haze was measured using a spectrophotometer (Nippon Denshoku Industries Co., Ltd., COH-400), based on a film having a thickness of 50 μm according to ASTM D1003 standard. The haze is in %.

A change in a haze before and after coating was calculated using the following Equation:

$$\Delta H(\%) = |H2 - H1|$$

wherein H1 is a haze of the polyimide-based film before the coating layer is formed, and H2 is a haze of the window cover film on which the coating layer is formed.

5) Yellowness (YI) and b* Value

A yellowness and a b* value were measured using a colorimeter (Hunter Associates Laboratory, Inc., ColorQuest XE), based on a film having a thickness of 50 μm according to ASTM E313 standard.

6) Weight Average Molecular Weight (Mw) and Polydispersity Index (PDI)

A weight average molecular weight and a polydispersity index of the manufactured film were measured as follows.

First, a film sample was dissolved in a DMAc eluent containing 0.05M LiBr and used as a sample. Measurement was performed using gel permeation chromatography (GPC) (Waters GPC system, Waters 1515 isocratic HPLC Pump, Waters 2414 Refractive Index detector), a GPC column was connected to Olexis, Polypore and mixed D columns, a DMAc solution was used as the solvent, polymethylmethacrylate (PMMA STD) was used as the standard, and the analysis was performed at 35° C. at flow rate of 1 mL/min.

7) Scratch (Abrasion Resistance Evaluation)

A film was cut into a size of 7 cm×12 cm and fixed to a jig of a wear-resistant tester (Kipae E&T CO., Ltd.), and steel wool (#0000, Liberon Ltd) was mounted and fixed on a square tip of 2 cm×2 cm, with respect to a hard coating films manufactured in Examples and Comparative Examples according to ASTM D2197. A moving distance of 100 mm, a moving speed of 40 cycles/min, and a load of 1.0 Kg were set, a surface of an antifouling layer of the hard coating film was rubbed with the steel wool 10 times, and then the number of flaws (scratches) on the surface was visually observed. The scratch was measured on the basis of the case where 5 or less of flaws (regardless of size) have occurred.

8) Solubility

The solubility of the films manufactured in Examples and Comparative Examples in the ethyl cellosolve solvent was evaluated as follows.

$$\frac{(FW_1 - FW_2)}{FW_1} \times 100 \qquad \text{[Equation]}$$

wherein $FW_1$ is a weight of an initial film before being immersed in a solvent, and $FW_2$ is a weight of the film measured after the film is immersed in the ethyl cellosolve solvent, left at 60° C. for 2 hours, and cooled to room temperature, the solvent is removed, and the film is dried at 80° C. for 4 hours.

As a more specific measurement method, 100 g of the ethyl cellosolve was placed in a 250 mL sealed container with a lid, and 5 g of the polyimide-based film manufactured in the Example was cut and put into the container so as to be completely immersed in the solvent. Thereafter, the lid of the container was completely closed, the film was left in a convection oven at 60° C. for 2 hours, and then cooled to room temperature. Subsequently, the solution was first filtered using a filter paper attached to a filtering flask to remove the solvent, and the residual solid content was dried in a convection oven at 80° C. for 4 hours to remove the residual solvent, and then the weight was measured and calculated by Equation above.

PREPARATION EXAMPLE 1

Preparation of Composition for Forming Hard Coating Layer 2-(3,4-epoxycyclohexyl)ethyltrimethoxysilane (ECTMS, TCI Co., Ltd.) and water were mixed in a ratio of 24.64 g:2.70 g (0.1 mol:0.15 mol) to prepare a reaction solution, and the reaction solution was placed in a 250 mL 2-neck flask. 0.1 mL of a tetramethylammonium hydroxide catalyst (Sigma-Aldrich) and 100 mL of tetrahydrofuran (Sigma-Aldrich) were added to the mixture and stirred at 25° C. for 36 hours. Thereafter, layer separation was performed, a product layer was extracted with methylene chloride (Sigma-Aldrich), moisture was removed from the extract using magnesium sulfate (Sigma-Aldrich), and the solvent was dried under vacuum to obtain an epoxy siloxane-based resin. The weight average molecular weight of the epoxy siloxane-based resin was 2500 g/mol as a result of measurement using gel permeation chromatography (GPC).

30 g of the epoxy siloxane-based resin thus prepared, 10 g of (3',4'-epoxycyclohexyl)methyl 3,4-epoxycyclohexanecarboxylate as a crosslinking agent, 5 g of bis[(3,4-epoxycyclohexyl)methyl]adipate, 0.5 g of (4-methylphenyl)[4-(2-methylpropyl)phenyl]iodoniumhexafluorophosphate as a photoinitiator, and 54.5 g of methyl ethyl ketone were mixed to prepare a composition.

EXAMPLE 1

<Preparation of Polyimide-Based Film>

Terephthaloyl dichloride (TPC) and 2,2'-bis(trifluoromethyl)-benzidine (TFMB) in a mixed solution of dichloromethane and pyridine were added to a reactor, and stirred at 25° C. for 2 hours under a nitrogen atmosphere. At this time, a molar ratio of TPC:TFMB was set to 300:400, and the solid content was adjusted to be 10% by weight. Thereafter, the reactant was precipitated in an excess of methanol, and then the solid content obtained by filtration was dried under vacuum at 50° C. for 6 hours or more to obtain an oligomer. The prepared oligomer had a formula weight (FW) of 1670 g/mol.

N,N-dimethylacetamide (DMAc), 100 moles of the oligomer, and 28.6 moles of 2,2'-bis(trifluoromethyl)-benzidine (TFMB) were added to the reactor as a solvent and sufficiently stirred. After confirming that the solid raw material was completely dissolved, a fumed silica (surface area 95 m$^2$/g, <1 μm) was added to DMAc in an amount of 1000 ppm relative to the solid, and dispersed using ultrasonic waves. 64.3 moles of cyclobutanetetracarboxylic dianhydride (CBDA) and 64.3 moles of 4,4'-hexafluoroisopropylidene diphthalic anhydride (6FDA) were sequentially added and sufficiently stirred, followed by polymerization at 40° C. for 10 hours. At this time, the solid content was 20% by weight. Then, each of pyridine and acetic anhydride was sequentially added to the solution at 2.5 times the moles of the total dianhydride content, and stirred at 60° C. for 12 hours.

After the polymerization was completed, the polymerized solution was precipitated in an excess of methanol, and then the solid content obtained by filtration was dried under vacuum at 50° C. for 6 hours or more to obtain a polyamide-imide powder. The powder was diluted and dissolved in a DMAc at 20% by weight to prepare a polyimide-based resin solution.

The polyimide-based resin solution was applied onto a support (glass) using an applicator, dried at 80° C. for 30 minutes and 100° C. for 1 hour, and then cooled at room temperature to manufacture a film. Then, a stepwise heat treatment was performed at 100 to 200° C. and 250 to 300° C. for 2 hours at a heating rate of 20° C./min.

The manufactured polyamide-imide film had a thickness of 50 μm, a total light transmittance of 89.73%, a haze of 0.4%, a yellowness (YI) of 1.9, a b* value of 1.0, a modulus of 6.5 GPa, an elongation at break of 21.2%, a weight average molecular weight of 310,000 g/mol, a polydispersity index (PDI) of 2.11, and a pencil hardness of HB. In addition, it was confirmed that the solubility was 48% as a result of measuring the solubility of the manufactured film.

Next, the composition for forming a hard coating layer prepared in Preparation Example 1 was applied on the polyamide-imide film using a Meyer bar, dried at 60° C. for 5 minutes, UV irradiated at 1 J/cm$^2$ using a high-pressure metal lamp, and then cured at 120° C. for 15 minutes to manufacture a window cover film on which a hard coating layer having a thickness of 10 μm is formed. A haze and the amount of change in the haze of the manufactured window cover film were measured, and are shown in Table 1.

EXAMPLE 2

The film was manufactured in the same manner as that in Example 1, except that in the preparation of polyamide-imide, 100 moles of oligomer and 28.6 moles of 2,2'-bis(trifluoromethyl)-benzidine (TFMB) were used, and 51.44 moles of cyclobutanetetracarboxylic dianhydride (CBDA) and 77.16 moles of 4,4'-hexafluoroisopropylidene diphthalic anhydride (6FDA) were used.

The manufactured polyamide-imide film had a thickness of 50 μm, a total light transmittance of 89.05%, a haze of 0.47%, a yellowness (YI) of 1.89, a b* value of 0.9, a modulus of 6.6 GPa, an elongation at break of 21.5%, a weight average molecular weight of 311,000 g/mol, a polydispersity index (PDI) of 2.10, and a pencil hardness of HB. In addition, it was confirmed that the solubility was 32% as a result of measuring the solubility of the manufactured film.

Next, the composition for forming a hard coating layer prepared in Preparation Example 1 was applied on the polyamide-imide film using a Meyer bar, dried at 60° C. for 5 minutes, UV irradiated at 1 J/cm$^2$ using a high-pressure metal lamp, and then cured at 120° C. for 15 minutes to manufacture a window cover film on which a hard coating layer having a thickness of 10 μm is formed. A haze and an amount of change in the haze of the manufactured window cover film were measured, and are shown in Table 1.

EXAMPLE 3

The film was manufactured in the same manner as that in Example 1, except that in the preparation of polyamide-imide, 100 moles of oligomer and 28.6 moles of 2,2'-bis(trifluoromethyl)-benzidine (TFMB) were used, and 38.58 moles of cyclobutanetetracarboxylic dianhydride (CBDA) and 90.02 moles of 4,4'-hexafluoroisopropylidene diphthalic anhydride (6FDA) were used.

The manufactured polyamide-imide film had a thickness of 50 μm, a total light transmittance of 89.53%, a haze of 0.55%, a yellowness (YI) of 1.91, a b* value of 0.95, a modulus of 6.7 GPa, an elongation at break of 23.5%, a weight average molecular weight of 309,000 g/mol, a polydispersity index (PDI) of 2.11, and a pencil hardness of HB. In addition, it was confirmed that the solubility was 21% as a result of measuring the solubility of the manufactured film.

Next, the composition for forming a hard coating layer prepared in Preparation Example 1 was applied on the polyamide-imide film using a Meyer bar, dried at 60° C. for 5 minutes, UV irradiated at 1 J/cm$^2$ using a high-pressure metal lamp, and then cured at 120° C. for 15 minutes to manufacture a window cover film on which a hard coating layer having a thickness of 10 μm is formed. A haze and an amount of change in the haze of the manufactured window cover film were measured, and are shown in Table 1.

EXAMPLE 4

The film was manufactured in the same manner as that in Example 1, except that in the preparation of polyamide-imide, 100 moles of oligomer and 28.6 moles of 2,2'-bis(trifluoromethyl)-benzidine (TFMB) were used, and 35.365 moles of cyclobutanetetracarboxylic dianhydride (CBDA)

and 93.235 moles of 4,4'-hexafluoroisopropylidene diphthalic anhydride (6FDA) were used.

The manufactured polyamide-imide film had a thickness of 50 μm, a total light transmittance of 89.53%, a haze of 0.58%, a yellowness (YI) of 1.95, a b* value of 1.0, a modulus of 6.6 GPa, an elongation at break of 22.5%, a weight average molecular weight of 315,000 g/mol, a polydispersity index (PDI) of 2.10, and a pencil hardness of HB. In addition, it was confirmed that the solubility was 10% as a result of measuring the solubility of the manufactured film.

Next, the composition for forming a hard coating layer prepared in Preparation Example 1 was applied on the polyamide-imide film using a Meyer bar, dried at 60° C. for 5 minutes, UV irradiated at 1 J/cm² using a high-pressure metal lamp, and then cured at 120° C. for 15 minutes to manufacture a window cover film on which a hard coating layer having a thickness of 10 μm is formed. A haze and an amount of change in the haze of the manufactured window cover film were measured, and are shown in Table 1.

COMPARATIVE EXAMPLE 1

<Preparation of Polyimide-Based Film>

N,N-dimethylacetamide (DMAc) and 100 parts by weight of 2,2'-bis(trifluoromethyl)-benzidine (TFMB) were added to a reactor under nitrogen atmosphere and stirred sufficiently, and then 30 parts by weight of 4,4'-hexafluoroisopropylidene diphthalic anhydride (6FDA) was added thereto, followed by sufficient stirring until dissolved. Thereafter, 30 parts by weight of 3,3',4,4'-biphenyltetracarboxylicdianhydride (BPDA) was added thereto, followed by sufficient stirring until dissolved. Thereafter, 40 parts by weight of terephthaloyl dichloride (TPC) was added thereto and stirred for 6 hours to dissolve and react to prepare a polyamic acid resin composition. Each monomer was adjusted to be 6.5% by weight of solid content. Pyridine and acetic anhydride were sequentially added to the composition at 2.5 times the number of moles of the total dianhydride, respectively, and stirred at 60° C. for 1 hour. Thereafter, the solution was precipitated in an excess of methanol, and then the solid content obtained by filtration was dried under vacuum at 50° C. for 6 hours or more to obtain a polyamide-imide powder. The powder was diluted and dissolved in a DMAc at 20% by weight to prepare a composition for forming a substrate layer.

The composition for forming a substrate layer was cast on a glass substrate to separate the formed substrate layer film from the substrate. The substrate layer film had a thickness of 50 μm.

The total light transmittance was 89.03%, the haze was 0.47%, the yellowness (YI) was 4.6, and the b* value was 1.85 as a result of measuring the physical properties of the manufactured film. In addition, it was confirmed that the solubility was 100% as a result of measuring the solubility of the manufactured film.

Next, the composition for forming a hard coating layer prepared in Preparation Example 1 was applied on the polyamide-imide film using a Meyer bar, dried at 60° C. for 5 minutes, UV irradiated at 1 J/cm² using a high-pressure metal lamp, and then cured at 120° C. for 15 minutes to manufacture a window cover film on which a hard coating layer having a thickness of 10 μm is formed. A haze and an amount of change in the haze of the manufactured window cover film were measured, and are shown in Table 1.

COMPARATIVE EXAMPLE 2

<Preparation of Polyimide-Based Film>

N,N-dimethylacetamide (DMAc) and 100 parts by weight of 2,2'-bis(trifluoromethyl)-benzidine (TFMB) were added to a reactor under nitrogen atmosphere and stirred sufficiently, and then 30 parts by weight of 4,4'-hexafluoroisopropylidene diphthalic anhydride (6FDA) was added thereto, followed by sufficient stirring until dissolved. Thereafter, 45 parts by weight of 3,3',4,4'-biphenyltetracarboxylicdianhydride (BPDA) was added thereto, followed by sufficient stirring until dissolved. Thereafter, 25 parts by weight of terephthaloyl dichloride (TPC) was added thereto and stirred for 6 hours to dissolve and react to prepare a polyamic acid resin composition. Each monomer was adjusted to be 6.5% by weight of solid content. Pyridine and acetic anhydride were sequentially added to the composition at 2.5 times the number of moles of the total dianhydride, respectively, and stirred at 60° C. for 1 hour. Thereafter, the solution was precipitated in an excess of methanol, and then the solid content obtained by filtration was dried under vacuum at 50° C. for 6 hours or more to obtain a polyamide-imide powder. The powder was diluted and dissolved in a DMAc at 20% by weight to prepare a composition for forming a substrate layer.

The composition for forming a substrate layer was cast on a glass substrate to separate the formed substrate layer film from the substrate. The substrate layer film had a thickness of 50 μm.

The total light transmittance was 88.53%, the haze was 0.52%, tge yellowness (YI) was 4.5, and the b* value was 1.89 as a result of measuring the physical properties of the manufactured film. In addition, it was confirmed that the solubility was 61% as a result of measuring the solubility of the manufactured film.

Next, the composition for forming a hard coating layer prepared in Preparation Example 1 was applied on the polyamide-imide film using a Meyer bar, dried at 60° C. for 5 minutes, UV irradiated at 1 J/cm² using a high-pressure metal lamp, and then cured at 120° C. for 15 minutes to manufacture a window cover film on which a hard coating layer having a thickness of 10 μm is formed. A haze and an amount of change in the haze of the manufactured window cover film were measured, and are shown in Table 1.

TABLE 1

| | CBDA content (mol) | Polyimide-based film Haze (H1, %) | Polyimide-based film Solubility (%) | Window cover film Haze (H2, %) | Window cover film ΔH (%) |
|---|---|---|---|---|---|
| Example 1 | 64.3 | 0.4 | 48 | 0.5 | 0.1 |
| Example 2 | 51.44 | 0.47 | 32 | 0.42 | 0.05 |
| Example 3 | 38.58 | 0.55 | 21 | 0.7 | 0.15 |
| Example 4 | 35.365 | 0.58 | 10 | 0.9 | 0.32 |
| Comp. Example 1 | — | 0.47 | 100 | 2.7 | 2.23 |
| Comp. Example 2 | — | 0.52 | 61 | 2.2 | 1.68 |

According to the present invention, the polyimide-based film having a low solubility in the solvent, particularly, the ethyl cellosolve solvent in the post-process of forming the hard coating layer in order to use the polyimide-based film as the window cover film is provided. Accordingly, the window cover film in which the haze is not increased when forming the hard coating layer and which is transparent may be provided.

The window cover film according to the present invention may have an excellent mechanical property, prevent the occurrence of an optical property, especially a rainbow phenomenon, and minimize a change in a surface property during the process such as the coating process.

In addition, the polyimide-based film and the window cover film including the same according to the present invention have excellent optical properties and visibility such that they may be applied to various display fields.

Hereinabove, although the present invention has been described by specific matters and the limited embodiments, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

What is claimed is:

1. A window cover film, comprising:
a polyimide-based film, the polyimide-based film prepared by forming an oligomer of aromatic diacid dichloride and a first fluorine-based aromatic diamine, then reacting the oligomer with a second fluorine-based aromatic diamine, an aromatic dianhydride and a cycloaliphatic dianhydride; and
a coating layer formed on one or both surfaces of the polyimide-based film:
wherein the coating layer is formed from epoxy siloxane-based resin,
wherein the polyimide-based film whose solubility in an ethyl cellosolve solvent satisfies the following Equation 1:

$$\frac{(FW1 - FW2)}{FW1} \times 100 \leq 50\% \qquad \text{[Equation 1]}$$

wherein $FW_1$ is a weight of an initial film before being immersed in a solvent, and
$FW_2$ is a weight of the film measured after the film is immersed in an ethyl cellosolve solvent, left at 60° C. for 2 hours, and cooled to room temperature, the solvent is removed, and the film is dried at 80° C. for 4 hours, and
wherein a change rate in a haze $\Delta H$ according to the following Equation 2 of the window cover film is 1.5% or less:

$$\Delta H = |H2 - H1| \qquad \text{[Equation 2]}$$

wherein H1 is a haze of the polyimide-based film before forming the coating layer, and H2 is a haze of the window cover film on which the coating layer is formed.

2. The window cover film polyimide-based film of claim 1, wherein the solubility is 20 to 50%.

3. The window cover film of claim 1, wherein the polyimide-based film has a modulus of 4 GPa or more and an elongation at break of 8% or more according to ASTM D882, a light transmittance of 5% or more measured at 388 nm and a total light transmittance of 87% or more measured at 400 to 700 nm according to ASTM D1746, a haze of 2.0% or less according to ASTM D1003, and a yellowness of 5.0 or less and a b* value of 2.0 or less according to ASTM E313.

4. The window cover film of claim 1, wherein the polyimide-based film has a polyamide-imide structure.

5. The window cover film of claim 4, wherein the polyimide-based film includes a unit derived from a fluorine-based aromatic diamine, a unit derived from an aromatic dianhydride, a unit derived from a cycloaliphatic dianhydride, and a unit derived from an aromatic diacid dichloride.

6. The window cover film of claim 5, wherein the cycloaliphatic dianhydride includes cyclobutane tetracarboxylic dianhydride (CBDA).

7. The window cover film of claim 1, wherein a thickness of the polyimide-based film is 10 to 500 μm.

8. The window cover film of claim 1, wherein a haze of the window cover film is 1.5% or less.

9. A flexible display panel comprising the window cover film of claim 1.

* * * * *